United States Patent [19]

Collette et al.

[11] 4,335,225

[45] Jun. 15, 1982

[54] ELASTOMERIC POLYPROPYLENE

[75] Inventors: John W. Collette, Wilmington, Del.; Charles W. Tullock, Landenburg, Pa.

[73] Assignee: E. I. Du Pont de Nemours and Company, Wilmington, Del.

[21] Appl. No.: 240,138

[22] Filed: Mar. 3, 1981

Related U.S. Application Data

[63] Continuation of Ser. No. 917,282, Jun. 20, 1978, abandoned, which is a continuation-in-part of Ser. No. 814,878, Jul. 12, 1977, abandoned.

[51] Int. Cl.$^3$ .............................................. C08F 10/06
[52] U.S. Cl. .................................. 525/240; 526/154; 526/348; 526/348.2; 526/348.3; 526/348.4; 526/348.5; 526/348.6; 526/351; 526/905
[58] Field of Search ................ 525/240; 526/351, 348, 526/348.2, 348.3, 348.4, 348.5, 348.6

[56] References Cited

U.S. PATENT DOCUMENTS

| | | | |
|---|---|---|---|
| 3,112,301 | 11/1963 | Natta et al. | 526/351 |
| 3,175,999 | 3/1965 | Natta et al. | 526/351 |
| 3,257,370 | 6/1966 | Natta et al. | 526/351 |
| 3,329,741 | 7/1967 | Schrage et al. | 526/351 |
| 3,511,824 | 5/1970 | Listner | 526/351 |
| 3,784,502 | 1/1974 | Gobran et al. | 260/33.6 PQ |
| 3,932,307 | 1/1976 | Setterquist | 526/351 |
| 3,950,269 | 4/1976 | Setterquist | 526/351 |

FOREIGN PATENT DOCUMENTS

| | | |
|---|---|---|
| 2653379 | 6/1977 | Fed. Rep. of Germany . |
| 1138290 | 6/1957 | France . |
| 44-6827 | 3/1969 | Japan . |
| 856736 | 12/1960 | United Kingdom ................ 526/348 |

OTHER PUBLICATIONS

Kinsinger et al., Journal of Physical Chemistry, vol. 63, (1959), pp. 2002–2007.
Raff et al., Crystalline Olefin Polymers, Part I, vol. XX, Intersciences Publ., N.Y., (1965), pp. 376, 712–715.

Primary Examiner—Edward J. Smith

[57] ABSTRACT

A fractionable elastic polypropylene which has an inherent viscosity of 1.5–9, exhibits no yield point, has a tensile set not exceeding 150% and contains about 10 to 80% by weight of a diethyl ether-soluble fraction having an inherent viscosity exceeding 1.50. This polypropylene is a direct reaction product and thus need not be separated into its component parts to be a useful elastomer. Also described is the diethyl ether-soluble polypropylene fraction of the direct reaction product which has about 0.5% to about 5% isotactic crystallinity and exhibits birefringence when a film formed from said fraction is viewed under crossed Nicol prisms in a polarizing microscope at about 25° C. or is stretched between crossed polarizing sheets at about 25° C. The diethyl ether-soluble fraction itself is a useful elastomeric material.

15 Claims, 1 Drawing Figure

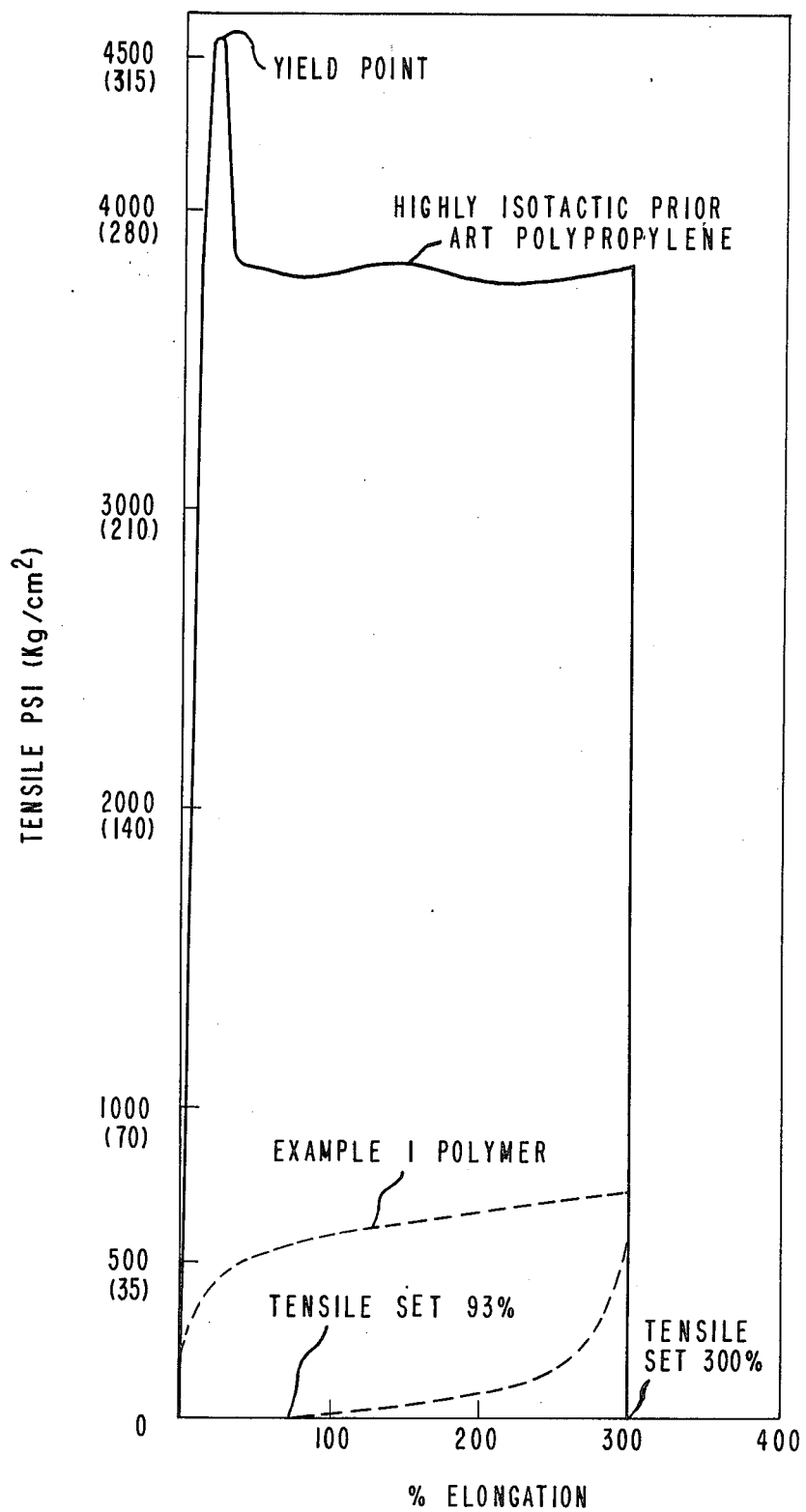

ELASTOMERIC POLYPROPYLENE

CROSS-REFERENCE TO RELATED APPLICATION

This is a continuation of application Ser. No. 917,282, filed June 20, 1978, which is a continuation-in-part of application Ser. No. 814,878, filed July 12, 1977, both abandoned.

BACKGROUND OF THE INVENTION

This invention relates to elastic polymer consisting essentially of units derived from propylene.

Both crystalline and amorphous polypropylenes are well known. Crystalline polypropylene is generally regarded as consisting at least prevailingly of the isotactic or syndiotactic structure and amorphous polypropylene is generally regarded as consisting at least prevailingly of the atactic structure. U.S. Pat. Nos. 3,112,300 and 3,112,301, both to Natta et al., describe isotactic and prevailingly isotactic polypropylene, respectively. Structural formulae for isotactic and syndiotactic polypropylene are given in U.S. Pat. No. 3,511,824 to Listner. "Atactic" polypropylene is defined as polypropylene in which the substituent methyl groups are arranged randomly above and below the backbone chain of atoms when the latter are all in the same place.

Most commercial grades of polypropylene are highly crystalline and, as is well known, are used in the manufacture of plastic products. Amorphous polypropylenes are also available commercially and are generally gummy materials of little strength. The amorphous polypropylenes are usually present as a small fraction in prevailingly isotactic polypropylene and can be readily extracted. They are normally used in adhesive applications.

Rubbery polypropylenes are also known. Such products have been said to be produced directly by conventional polymerization using particular catalysts, by repeated extractions of conventional polypropylene, by chemical treatment of crystalline polypropylene and by sequential polymerization processes. Representative rubbery polypropylenes are described in U.S. Pat. Nos. 3,329,741 to Schrage et al., 3,175,999 to Natta et al., 3,511,824 to Listner and 3,784,502 to Gobran et al. Such polypropylenes, however, have not found significant use in products requiring an elastic polymer.

There is a need, therefore, for a polypropylene with practical elastic properties that can be produced as a direct reaction product by a practical process.

SUMMARY OF THE INVENTION

This invention provides a fractionable, elastic polymer consisting essentially of units derived from propylene which has an inherent viscosity of 1.5-9, exhibits no yield point, has a tensile set not exceeding 150% and contains about 10-80% by weight of a diethyl ether-soluble fraction which has an inherent viscosity exceeding 1.50 and an isotactic crystalline content of about 0.5 to about 5% by weight and exhibits birefringence when a film formed from the fraction is viewed under crossed Nicol prisms in a polarizing microscope at about 25° C. or is stretched between crossed polarizing sheets at 25° C.

Also included in this invention is the diethyl ether-soluble polypropylene itself.

DESCRIPTION OF THE INVENTION

In one embodiment, this invention provides an elastic, fractionable product in which the "whole polymer", i.e., the direct reaction product itself without separation of any polypropylene components, is elastic, exhibiting properties similar to a vulcanized rubber. This result is achieved without sequential polymerization in which reaction conditions or proportions of monomers are varied during polymerization to produce alternating "blocks" in the polymer structure.

By "fractionable" is meant that the product is non-homogenous and thus consists essentially of two or more fractions which are readily separable by extraction with solvents such as diethyl ether and hexane. The whole polymers thus consist essentially of about 10-80 weight percent (preferably 40-75%) of diethyl ether-soluble fraction and varying proportions of other fractions, typically about 10-35 weight percent of a fraction soluble in boiling hexane but insoluble in boiling diethyl ether and about 10-55% of a fraction insoluble in boiling hexane.

The diethyl ether-soluble fraction itself is another embodiment of this invention.

"Diethyl ether-soluble" content or "ether-soluble" content as used herein with respect to a polypropylene is determined in boiling diethyl ether by the procedure described hereinafter under "Analytical Methods".

The measure of elasticity used in describing the polypropylenes of this invention is "tensile set" which is defined as the elongation remaining in a compression-molded specimen after it has been stretched at a rate of 20 inches (51 cm) per minute to 300% elongation at 72°-75° F. (22°-24° C.), then immediately allowed to recover at the same rate until the specimen is at zero stress. It is expressed as a percentage of the original length or distance between bench marks. The whole polymers and the preferred diethyl ether-soluble polypropylenes of this invention have a tensile set not exceeding 150% and preferably not exceeding 100%. Some samples have a tensile set of 75% or less.

The whole polymers of this invention do not exhibit a yield point. "Yield point" as used herein means that in the test of ASTM method D412 conducted to break at 20 inches (51 cm) per minute and 25° C. there is a strain (or elongation) value at which the stress (force) required to further increase the elongation decreases.

All tensile and stress-strain measurements referred to herein, including the examples, are carried out on straight or dumbbell specimens 0.25 inch (0.64 cm) wide and 0.018-0.080 inch (0.045-0.20 cm) thick by ASTM Method D 412, with the exception that where averages are specified, two samples of the product are tested.

The attached figure shows a stress-strain (hysteresis) curve of a typical polymer of this invention (the polymer of Example 1) in comparison with a prior art highly isotactic polypropylene, "Pro-fax" 6523 sold by Hercules, Inc., (isotactic content 94%). The polymer of Example 1 has a tensile set of 93% at the stretch rate of 20 inches/minutes (51 cm/min) and relaxation at the same rate. It shows no yield point. The isotactic polypropylene has a tensile set of 300% (i.e., shows no recovery) and does show a yield point at about 15% elongation at a stretch rate of 0.2 inch per minute (0.5 cm/min) and relaxation rate of 20 inches/minute (51 cm/min).

The whole polymers of this invention have an inherent viscosity of 1.5-9, preferably 3-8, and the diethyl ether-soluble fraction has an inherent viscosity greater than 1.5, and preferably greater than 2.5. Inherent viscosity as used herein is measured in decahydronaphthalene at 135° C. by the procedure described under "Analytical Methods" hereinafter. It is expressed in deciliters per gram (dl/g). The polypropylenes of this invention become increasingly elastic with increasing content and increasing inherent viscosity of the ether-soluble fraction. Birefringence is clearly visible when a film formed by pressing a sample of the ether-soluble fraction between microscope slides is viewed under crossed Nicol prisms in a hot-stage polarizing microscope at about 25° C. When the temperature is raised the birefringence disappears in the region of the melting point of the film. Birefringence is also clearly visible when a film formed from the ether-soluble fraction is pressed or stretched between crossed polarizing sheets at a temperature of about 25° C.

The whole polymers have an isotactic content of 55% or less and preferably about 25–45%. By "isotactic content" is meant the proportion of polymerized propylene units which occur in chain segments in which five successive polymerized propylene units have an identical steric configuration. Thus a polypropylene in which 45% of the polymerized propylene units are contained in segments of five or more successive polymerized propylene units, each such unit having the same steric configuration, has an isotactic content of 45%. Isotactic content as reported herein can be measured directly by $^{13}C$ nuclear magnetic resonance (NMR) according to methods known in the art, a suitable example of which is described under "Analytical Methods" hereinafter. For a given isotactic content, the polymers of this invention are highly elastic as shown by their tensile set and absence of yield point.

The whole polymers also have syndiotactic contents. By "syndiotactic content" is meant that part of the polymerized propylene in which the methyl groups lie alternately above and below the plane of the main chain. Syndiotactic content also can be measured directly by $^{13}c$ nmr.

The whole polymers have a tensile strength in the range from about 400 psi to 2500 psi (28 kg/cm$^2$ to 175 kg/cm$^2$) as determined by ASTM Method D 412; the ether-soluble fractions have tensile strengths from about 100 psi (7 kg/cm$^2$) to 600 psi (42 kg/cm$^2$).

Each whole polymer has a major melting point between about 135°–155° C. as determined by the method described under "Analytical Methods" hereinafter.

The diethyl ether-soluble fractions of the new elastic polypropylenes have properties that distinguish them from solvent-extracted fractions of polypropylenes of the art. For example, they have relatively broad molecular-weight distributions, as indicated by relatively high values of the ratio $M_w/M_n$, where $M_w$ is weight-average molecular weight and $M_n$ is number-average molecular weight. See Billmeyer, "Textbook of Polymer Science", pp 6–7 (Interscience/Wiley, 1962). The ratio $M_w/M_n$ is referred to herein as dispersity. It is determined by gel permeation chromatography (gpc).

The diethyl ether-soluble fractions also have relatively high inherent viscosities in relation to the inherent viscosities of the corresponding whole polymers. The ratio of the inherent viscosity of the ether-soluble fraction to the inherent viscosity of the whole polymer is usually in the range 0.5–0.9.

In addition the diethyl ether-soluble fractions have isotactic crystalline contents from about 0.5 to about 5% by weight. Crystalline content is strongly suggested by birefringence, and is demonstrated by and determined from heat of fusion ($\Delta hf$) and $^{13}C$ nmr. The $^{13}C$ nmr data show that the crystallinity of these fractions is isotactic. The techniques for determining the above-mentioned properties are discussed under "Analytical Methods" hereinafter.

The foregoing discussion of properties of the ether-soluble fractions applies in particular to the ether-soluble fractions of whole polymers that have been isolated from the polymerization mixture by methods that do not involve hot melting or extrusion. Generally, such whole polymers as isolated from the reaction show a higher percentage of ether-extractable components, i.e., about 30–80%, than after hot melting, extrusion, or other fabrication techniques. The decrease is believed to be due to interaction of the ether-soluble fraction with more-highly crystalline components in the product.

The high molecular weight, diethyl ether-soluble component is the key factor contributing to the elastic properties of the polymers of the invention. In this regard, the polymers differ from those of the prior art, in which elastomeric properties are limited to the fraction soluble in hexane. The ether-soluble fraction of the polymers of the invention is highly elastic but generally has low tensile strength. It may be combined with more crystalline polypropylenes (i.e., those of higher isotactic content) to provide elastomeric materials with much-improved tensile strength. It is believed that the isotactic units in the more crystalline polypropylene cocrystallize with the isotactic units in the ether-soluble component to provide a crosslinked elastomeric network.

The polypropylenes of this invention can be prepared by polymerizing propylene in the presence of a catalyst which is the reaction product of an organometallic compound with a partially hydrated surface of a metal oxide such as $Al_2O_3$, $TiO_2$, $SiO_2$, and MgO or physical mixtures thereof. The organometallic compounds are those of the formula $(RCH_2)_4M$, where M is Ti, Zr or Hf; R is aryl, aralkyl, tertiary alkyl, (e.g., trialkylmethyl), or trialkylsilyl; and the $RCH_2$ group has no hydrogen bonded to the atom in the beta-position to M. The aforementioned alkyl groups can contain from 1–12 carbon atoms.

Typically, the two catalyst components are reacted in the ratio of 0.01–1.0 millimole of the organometallic compound per gram of metal oxide. The preferred catalysts are those resulting from the reaction of organozirconium compounds $(RCH_2)_4Zr$, especially tetraneophylzirconium (TNZ), with hydroxylated alumina ($Al_2O_3$) in the ratio of about 0.1–1.0 millimole of organozirconium compound per gram of alumina. Such catalysts and their preparation are described in U.S. Pat. No. 3,932,307 to Setterquist. Preferably, the hydroxylated alumina is prepared by allowing fumed alumina to equilibrate with and thereby adsorb atmospheric moisture followed by heating at about 120°–500° C. for 1 min-10 hrs in a stream of nitrogen. Suitable catalysts also include the reaction product of other organometallic compounds as described above with the aforementioned metal oxides, said catalysts being prepared in the same manner as the preferred "neophylzirconium aluminate on alumina" catalyst described above. Representative organometallic compounds include tetraneopentylzirconium, tetrabenzyltitanium, tetrabenzylzirconium, tetraneopentylhafnium, tetrabenzylhafnium, tetrakis(trimethylsilylmethyl)zirconium, tetraneophyltitanium and tetraneopentyltitanium.

Also included among the suitable catalysts are those prepared by hydrogenating the aforementioned reaction products of the organometallic compound and metal oxide according to the process described in U.S. Pat. No. 3,950,269 to Setterquist.

In the polymerization process, the catalyst, normally in the form of a suspension in a hydrocarbon such as cyclohexane (about 25–50 milliliters of hydrocarbon per gram of metal oxide), is brought into contact with propylene in liquid form or the propylene may be dissolved in a suitable solvent such as hexane or cyclohexane. Whichever of these types of medium is used, the catalyst can also be prepared by bringing the components together in the presence of the monomer or monomers. Preferably, the reaction medium is liquid propylene, and the reaction involves formation of a slurry of polypropylene in the liquid monomer. Normally the catalyst is present in the amount of 1 gram-atom of zirconium, hafnium or titanium in the catalyst per 200,000–2,000,000 grams of propylene.

The reaction can be carried out at atmospheric pressure or at elevated pressure up to 5000 psi (350 kg/cm$^2$). Both batch and continuous polymerization can be employed. The usual batch reaction time is about 10 minutes to one hour. Reaction temperatures range from about 0° C.–175° C., preferably 25° C.–100° C.

It has been found that the presence of hydrogen in the reaction medium not only reduces the inherent viscosity of the polymers of this invention, but also increases the proportion of the diethyl ether-soluble fraction. The polypropylenes of this invention are therefore usually prepared in the presence of hydrogen gas. Thus, when using a neophylzirconium aluminate on alumina catalyst at 50° C., a partial pressure of hydrogen of about 20 psi (1.4 kg/cm$^2$) will result in a product containing at least 35% ether-soluble fraction having an inherent viscosity of at least 1.50 and usually 2 or more. As the amount of hydrogen is increased, the proportion of ether-soluble fraction increases, generally without significantly decreasing the inherent viscosity of such fraction.

The ratio of zirconium to metal oxide in the catalyst system affects the proportion of ether-soluble fraction obtained both in the presence and absence of hydrogen. Thus, with neophylzirconium aluminate on alumina catalysts, a ratio of zirconium to alumina of about 0.6 millimole of tetraneophylzirconium per gram of alumina normally yields a polymer containing about 30% by weight of ether-soluble fraction. As the zirconium-alumina ratio decreases, the proportion of ether-soluble fraction increases.

The inherent viscosity of the whole polymers and the proportion of ether-soluble fraction can also be controlled by reaction temperature. As the reaction temperature increases, the inherent viscosity will decrease, and the proportion of ether-soluble fraction will increase, particularly at temperatures above about 50° C.

The tensile set of the whole polymers generally decreases as the content and inherent viscosity of the ether-soluble fraction increase. The polymers have particularly low tensile sets when the inherent viscosity of the ether-soluble fraction is 2.5 or higher. The examples illustrate methods for making such polymers.

Although the order in which propylene, hydrogen, and the catalyst are supplied to the reaction zone is usually without significant consequence, it has been found that when M is Hf, the proportion of ether-soluble polymer is increased if the catalyst is allowed to come in contact with hydrogen for at least about 5 minutes before the propylene is introduced.

After the excess propylene has been vented, the polypropylene can be isolated by conventional methods. When the reaction medium is liquid propylene, hot-milling, extraction-extrusion, or steam-stripping can be used to remove any remaining unreacted propylene and any volatile solvent that was part of the catalyst slurry. Alternatively, the product mixture can be swollen to a gel by addition of a liquid hydrocarbon such as cyclohexane and the polypropylene can be precipitated and converted to a filterable solid by addition of a liquid such as acetone, following which it is isolated by filtration. When the reaction medium is a liquid such as cyclohexane, the polypropylene can be isolated by precipitation with acetone followed by filtration as just described.

As stated previously, the isolation technique used can influence the amount of diethyl ether-soluble fraction observed in the recovered polymer.

The polypropylenes of this invention are produced in good yield, particularly when neophylzirconium aluminate-on-alumina catalysts are used. Yields range from about 30,000 to 1,000,000 grams of polymer per gram-atom of zirconium, and are usually at least about 200,000 grams of polymer per gram-atom of zirconium.

The ether-soluble fraction of this invention is separated by extraction with boiling diethyl ether.

The polypropylenes of this invention include copolymers containing small amounts of units derived from α-olefins other than propylene, e.g., up to about 10 mole % of the whole polymer. Such α-olefins can be incorporated into the polymers by copolymerization without changing the essential properties described herein. Representative of such α-olefins are ethylene, 1-butene, 1-pentene, and 1-hexene.

The whole polymers of this invention as well as the ether-soluble fractions can be blended with highly isotactic polypropylene over wide proportions, e.g., 2–98 weight percent, to produce blends having useful properties. Blends containing about 60 to 95% by weight of the polypropylene of this invention and 40 to 5% by weight of highly isotactic polypropylene generally have elastomeric properties. The highly isotactic polypropylene used has an isotactic content of at least about 85%. There are several commercial polypropylenes of this type, an example being "Pro-fax" 6523 described above.

The polypropylenes of this invention can be processed in the same manner as conventional elastomers. If desired, the product can be compounded with additives such as carbon black, mineral fillers, oil and pigments. The polypropylenes are excellent general purpose thermoplastic elastomers having properties which make them suitable for use in films (including heat shrinkable films), filaments, fibers, and sheets which have elastomeric properties and for fabric coating applications, wire and cable coatings, hot melt adhesives and injection molded, compression molded or extruded articles such as tires and tubing.

Oriented objects such as uniaxially oriented strapping and uniaxially or biaxially oriented films can also be formed from the whole polymers and from the aforementioned elastomeric blends. The uniaxially oriented films show excellent elastic recovery on subsequent elongation. The biaxially oriented films are particularly valuable in packaging applications as they combine the property of low shrinkage tension which is desirable in heat shrinkable wrapping with high extensibility which is desirable in stretch wrapping. Biaxially oriented films can be made using known techniques in which, for example, the film is simultaneously extended (usually 400–700%) in two directions followed by gradually relieving the tension. The film may be heated up to about 125° C. during stretching in which case it is cooled while still under tension.

The polymers of this invention do not require the addition of extractible plasticizers for high flexibility and so are also especially useful for extruded flexible tubing used in contact with such liquids as milk, blood and parenteral fluids. Such tubing can be made by known techniques such as melt extrusion at temperatures between about 390° F. and 480° F. (200° C. and 250° C.) in an extruder containing a polyethylene screw and a tubing die-and-pin arrangement. The tubing is extruded into a vacuum box filled with water to quench the product and maintain its dimensions. Normally, the whole polymers or elastomeric blends of the whole polymers with highly isotactic polypropylene are used in this application.

Products of the type mentioned above can be made directly from the whole polymers and often from the diethyl ether-soluble fraction of this invention, and from blends of these polymers with highly isotactic polypropylene. In certain applications the polymers may be subjected to thermal and mechanical treatment such as shear for use in products requiring lower molecular weights and narrower molecular weight distributions. A particularly important advantage of this invention is that it provides an elastomeric polypropylene that is produced directly and thus need not be separated into its components to be used in the manufacture of such products.

Analytical Methods

Solubility in any solvent as referred to herein is determined as follows:

The solvent is heated to boiling in a round bottom glass flask. The vapors rise through the outer zone of a vertical cylindrical chamber and are cooled in a reflux condenser. The condensate drips into a fiber thimble or a glass thimble with a fritted glass filter disk in its bottom, such thimble being suspended in the center of the vertical cylinder. The thimble contains a sample (1–2 g) of the polypropylene, of average particle size no greater than about ⅛ inch (3 mm). The outer wall of the thimble is surrounded by and heated by the hot solvent vapor, so that the actual extraction is conducted at or near the boiling temperature of the solvent. Extraction is continued until there is no more than an 0.01 g loss in an overnight (at least 15 hr) extraction period. The entire operation is carried out in an atmosphere of nitrogen and solvent vapor. The proportion of the sample extracted is the soluble portion.

Inherent viscosity as referred to herein is determined as follows:

At 25° C., 0.0275 g of the polypropylene sample is placed in 50 ml of decahydronaphthalene containing 1.0 g/l BHT (2,6-di-t-butyl-4-methylphenol) to give a weight-volume concentration of 0.05% at 135° C., at which temperature the sample is dissolved under nitrogen as it is stirred with a magnetic stirrer for two hours. The solution is poured through a filter stick into a Cannon-Ubbelohde viscometer in which its efflux time is measured at 135° C. in comparison with that of the solvent alone.

$$\text{Viscosity } (\eta_{inh}) = \frac{\ln \frac{T}{T_o}}{C}$$

T = efflux time of solution
$T_o$ = efflux time of solvent
C = concentration (0.05 gram per deciliter)

Isotactic content as referred to herein is determined by $^{13}C$ nmr spectra as follows:

The $^{13}C$ nmr spectra are obtained at 137° C. with a Bruker WH-90 nmr spectrometer operating at 22.63 MHz in the Fourier transform mode. For typical runs, 10,000 scans are taken. The radio frequency pulse is adjusted to give a 60° tilt angle. Samples are run as solutions of 0.2 g polymer in a mixture of 1 ml o-dichlorobenzene and 1 ml dideuterotetrachloroethane containing 0.05% weight-volume BHT as stabilizer and tetramethylsilane as reference. The $^{13}C$ nmr isotactic content is the area of the mmmm pentad peak at ca. 21.7 ppm divided by the whole area of the $^{13}C$ methyl resonances; cf. Zambelli et al.; Macromolecules, 6, 925 (1973). Syndiotactic content is determined in the same manner from the peak at ca. 20.2 ppm.

Crystallinity by $^{13}C$ nmr

When a sample of polypropylene is examined by $^{13}C$ nmr as described above, and then examined again after the solution has cooled to ambient temperature, there may be a reduction in the height and the area of the mmmm pentad peak if there is crystallization of some sufficiently long isotactic sequences. This difference is a measure of the $^{13}C$ "rigidity" of the polymer and corresponds to the isotactic pentads that have become immobilized.

The observed percent pentad isotactic content of the hot and cool polymer solutions can be designated H and C, respectively. Then the % $^{13}C$ rigidity can be calculated from the equation $$\% \ ^{13}C \text{ rigidity} = H - \frac{C(100 - H)}{100 - C}$$

(The term (100-H)/(100-C) is used to bring the absolute values of the nonisotactic pentads of H and C to the same level.)

The % $^{13}C$ isotactic rigidity correlates with the crystallinity as measured by differential scanning calorimetry (see below). The % $^{13}C$ isotactic crystallinity can be obtained by the equation $$\% \ ^{13}C \text{ isotactic crystallinity} = 0.625 \times (\% \ ^{13}C \text{ isotactic rigidity})$$

The factor 0.625 is the slope of a straight line obtained by plotting $2\Delta h_f$ (see below) against % $^{13}C$ isotactic rigidity for a number of polypropylenes including Profax ® 6523.

Melting points as referred to herein are major melting points as determined by differential scanning calorimetry (dsc). A 10–20-mg sample is heated from −40° C. to 200° C. at 20° C./min, cooled from 200° C. to −40° C. at 5° C./min, and reheated from −40° C. to 200° C. at 10° C./min. The major melting point is taken from the heat flow/temperature curve obtained in the reheating operation, and is the temperature at the main endothermic peak thereon. The melting points of ether-soluble fractions are determined on the first heating. All the ether-soluble fractions in the examples that follow had comparable thermal histories (70° C./4 hr to remove volatiles, followed by room-temperature storage). For further discussion of procedures, see Ke, "Newer Methods of Polymer Characterization", p 350 (Interscience, 1964).

Crystallinity by heat of fusion

Heat of fusion, $\Delta h_f$, is calculated from the area enclosed by the dsc melting peak. The "start" and and "stop" temperatures, i.e., the lower and upper limits that determine the portion of the curve to be used in calculating the area, are selected visually as deviations of the curve from the baseline. The equation used is $\Delta h_f = \text{area}/Km$, where K is a calibration constant, assumed to be independent of temperature and determined by use of indium, which has a known heat of transition, and m is the mass of the sample. Values are reported as calories per gram. See Ke (above), pp 357–359.

The weight fraction of crystalline polymer, $X_c$, can be determined from the equation $\Delta h_f = X_c \Delta h_o$, where $\Delta h_f$ is the heat of fusion per gram of polymer and $\Delta h_o$ is the heat of fusion per gram of pure crystal. See Mark and Tobolsky, "Polymer Science and Materials", p 180 (Interscience/Wiley, 1971). For polypropylene a value of $\Delta h_o$ of 50 calories per gram has been proposed. $X_c$, expressed as a percent, equals $\Delta h_f/50 \times 100$, or $2\Delta h_f$.

Birefrigence or double refraction is a well-known optical phenomenon resulting from differences in refractive index for light that is polarized to correspond to differences in polarizability in different directions in an anisotropic material. It can be observed in minute detail under a polarizing microscope, and more simply as a multicolored spectral pattern when a film is stretched between two crossed polarizing sheets and viewed through the sheets. Both methods were used in the examples that follow. See, for example, Battista, "Fundamentals of High Polymers", pp 97–98 (Reinhold, 1958); Seymour, "Introduction of Polymer Chemistry", pp 284–285 (McGraw-Hill 1971); and Tanford, "Physical Chemistry of Macromolecules", pp 116–118 (Wiley, 1961).

The invention will be illustrated by the following examples wherein parts and percentages are by weight unless otherwise indicated.

Care is taken in each example to exclude oxygen and water from the polymerization and from all steps preceding it. All materials used are of high purity. Catalyst slurries are made up under nitrogen, and all transfers are carried out under nitrogen.

Except as noted, in each example the alumina support is prepared by allowing fumed alumina to equilibrate with atmospheric moisture followed by heating the resulting product for four hours at 400° C. in a stream of nitrogen and cooling under nitrogen.

EXAMPLE 1

A 1-liter stainless-steel autoclave equipped with a stirrer is heated at 150° C. for two hours while being evacuated. The vacuum source is shut off, nitrogen is charged to the autoclave to a pressure of 300 psi (21 kg/cm$^2$) and the system is allowed to cool to room temperature.

A slurry of catalyst is prepared by stirring 1 g of alumina (Al$_2$O$_3$) in 40 ml of cyclohexane for 14 hours, adding a solution of 0.36 mmol of tetraneophylzirconium in 2.0 ml of toluene, and stirring for one hour more. The slurry is transferred with a syringe to a 75-ml stainless-steel cylinder designed so that its contents can be injected by nitrogen pressure into the autoclave used for the polymerization.

Cyclohexane (450 ml) is passed through a bed of Woelm acid alumina into a glass container, and then under nitrogen pressure into the autoclave, which has been vented to atmospheric pressure and is being purged with nitrogen. The autoclave is evacuated to a pressure of about 50 mm for one minute and charged with 126 g of propylene during stirring at 500 rpm (pressure 90 psi (6.3 kg/cm$^2$) at 22° C.). Hydrogen is injected to a total pressure of 115 psi (8.0 kg/cm$^2$) (25 psi (1.8 kg/cm$^2$) partial pressure of hydrogen). The solution is heated to 50° C. and the catalyst slurry injected, whereupon the temperature rises to 70° C. over about five minutes. The system is then kept at 50°–52° C. for one hour from the time it first reaches 50° C. (total pressure 97–200 psi), (6.8–14 kg/cm$^2$), and the autoclave is vented, cooled, and opened. The viscous mixture that is recovered is divided into three approximately equal parts, and each is stirred in a blender with about 700 ml of acetone. The solids that form are separated by filtration, combined, and stirred in a blender with about 700 ml of acetone containing 0.3 g of Irganox®1010 antioxidant (tetrakis-[methylene 3-(3',5'-di-t-butyl-4'-hydroxyphenyl)propionate]-methane).

After filtration, air-drying, and drying in a vacuum oven at 70°–80° C. for 4 hours, there is obtained 102.4 g of polypropylene as a crumb-like solid. A test film pressed at 225° C. is nontacky and moderately strong, extensible, and elastic. The inherent viscosity of the polymer is 5.5 and the isotactic content by $^{13}$C nmr is 37%. Its melting point is 151° C.

The product contains 46.5% diethyl ether-soluble fraction which has an inherent viscosity of 3.1. Birefringence is clearly visible when a film formed from this fraction is stretched between crossed polarizing sheets at room temperature. The ratio of inherent viscosity of the ether-soluble fraction to the inherent viscosity of the whole polymer is 0.56. No reduction in syndiotactic pentads is observed in the $^{13}$C nmr. An isotactic crystallinity of 2% is determined by $^{13}$C nmr, and a melting point of 58° C. and a $\Delta h_f$ of 1.6 cal/g observed. The dispersity is equal to 7.6. Birefringence is also clearly visible when a film is viewed under crossed Nicol prisms in a hot-stage polarizing microscope at about 25° C. When the temperature is raised at 10° C. per minute, the birefringence disappears at about 78° C.

A 30-mil (0.76 mm) film of the whole polymer is prepared by hot-compression molding a sample of the product at 180° C. When samples of this film are extended at 20 inches (51 cm) per minute and immediately allowed to recover at the same rate to zero stress, they show an average tensile set of 93%. Another sample of this film in a stress-strain test to break shows a tensile strength at break of 966 psi (68 kg/cm$^2$) at 620% elongation. No yield point is observed in these determinations.

EXAMPLE 2

A 1-liter stainless-steel autoclave equipped with a stirrer is heated at 150° C. for two hours while being evacuated. The vacuum source is shut off, propylene charged to the autoclave to a pressure of 50 psi (3.5 kg/cm$^2$), and the system is allowed to cool to room temperature.

A slurry of benzylhafnium aluminate catalyst on alumina is prepared by stirring 1 g of alumina, a solution of 0.29 mmol of tetrabenzylhafnium in 3.0 ml of toluene, and 40 ml of cyclohexane for 17 hours.

The autoclave is vented to remove excess propylene, evacuated at about 50 mm for one minute, and cooled in ice/methanol. Stirring at 200 rpm is started, and the autoclave is charged with 168 g of propylene. The stirring rate is increased to 500 rpm, the system is warmed to 25° C. (pressure 155 psi) (10.8 kg/cm$^2$), and hydrogen admitted to the autoclave to a hydrogen partial pressure of 25 psi (1.8 kg/cm$^2$) (total pressure of 180 psi) (12.6 kg/cm$^2$). The catalyst slurry is then injected as in Example 1. The system is heated to 75° C. over 35 minutes and then heated at 72°–77° C. for one hour at autogenous pressure (400–435 psi) (28.0–30.5 kg/cm$^2$), after which the autoclave is vented and cooled.

The product is stirred with 300 ml of cyclohexane in a blender to convert it to a gel. Then one liter of acetone is added, the mixture stirred for about one minute and the product is separated by filtration. It is stirred in a blender with one liter of fresh acetone containing 0.3 g of Irganox ® 1010 antioxidant, separated by filtration, air-dried, and dried in a vacuum oven at 70°–80° C. for four hours to give 40.9 g of solid polypropylene. The inherent viscosity of the product is 8.2 and the isotactic content by $^{13}$C nmr is 45%. The melting point is 154° C.

On extraction with diethyl ether, the product is found to contain an ether-soluble fraction constituting 39.1% of the total polymer and having an inherent viscosity of 4.7 The ratio of the inherent viscosity of the ether-soluble fraction to the inherent viscosity of the whole polymer is 0.57. Birefringence is clearly visible when a film formed from this fraction is stretched between crossed polarizing sheets at room temperature. An isotactic crystallinity of 1% is determined by $^{13}$C nmr and a melting point of 57° C. and a $\Delta h_f$ of 1.5 cal/g observed. No reduction in syndiotactic pentads is observed in the $^{13}$C nmr. The dispersity is equal to 5.1. Birefringence is also clearly visible when a film is viewed under crossed Nicol prisms in a hot-stage polarizing microscope at about 25° C. When the temperature is raised at 10° C. per minute, the birefringence disappears at about 98° C.

An 18-mil (0.45-mm) film of the whole polymer is prepared by hot-compression molding a sample of the product at 180° C. When samples of this film are extended at 20 inches (51 cm) per minute and immediately allowed to recover at the same rate to zero stress, they show an average tensile set of 106%. Other samples of this film in stress-strain tests to break show an average tensile strength at break of 2280 psi (160 kg/cm$^2$) at 510% elongation. No yield point is observed in these determinations.

EXAMPLE 3

A 1-liter stainless-steel autoclave equipped with a stirrer is heated at 150° C. for two hours while being evacuated. The vacuum source is shut off, propylene is charged to the autoclave to a pressure of 50 psi (3.5 kg/cm$^2$), and the system is allowed to cool to room temperature.

A slurry of catalyst is prepared by stirring 1.0 g of alumina, a solution of 0.3 mmol of tetraneopentylzirconium in 4.0 ml of toluene, and 40 ml of cyclohexane for 16 hours.

The autoclave is vented to remove excess propylene, evacuated at about 50 mm for one minute, and cooled in ice. Stirring at 200 rpm is started, and the autoclave is charged with 168 g of propylene. The stirring rate is increased to 500 rpm, the system is warmed to 27° C. (pressure 165 psi; 11.5 kg/cm$^2$), and hydrogen is admitted to the autoclave to a hydrogen partial pressure of 25 psi (1.8 kg/cm$^2$) (total pressure of 190 psi; 13.3 kg/cm$^2$). The catalyst slurry is then injected as in Example 1. The system is heated to 50° C. over 16 minutes and then heated at 50°–54° C. for one hour at autogenous pressure (270–300 psi; 18.9–21.0 kg/cm$^2$), after which the autoclave is vented and cooled.

The product is stirred with 400 ml of cyclohexane in a blender to convert it to a gel. Then one liter of acetone is added, the mixture is stirred for about one minute, and the product is separated by filtration. It is stirred in a blender with one liter of fresh acetone containing 0.3 g of Irganox ® 1010 antioxidant, separated by filtration, air-dried in a vacuum oven at 70°–80° C. for four hours, to give 81.7 g of solid polypropylene. The inherent viscosity of the product is 5.4, the isotactic content by $^{13}$C nmr is 40% and the melting point is 150° C.

On extraction with diethyl ether the product is found to contain an ether-soluble fraction constituting 50.8% of the total polymer and having an inherent viscosity of 4.8. The ratio of the inherent viscosity of the ether-soluble fraction to the inherent viscosity of the whole polymer is 0.89. Birefringence is clearly visible when a film formed from this fraction is stretched between crossed polarizing sheets at room temperature. A melting point of 73° C. and a $\Delta h_f$ of 1.3 cal/g are observed. The dispersity is equal to 4.6.

A 29-mil (0.73-mm) film of the whole polymer is prepared by hot-compression molding a sample of the product at 180° C. When samples of this film are extended at 20 inches (51 cm) per minute and immediately allowed to recover at the same rate to zero stress, they show an average tensile set of 54%. Other samples of this film in stress-strain tests to break show an average tensile strength at break of 1500 psi (105 kg/cm$^2$) at 730% elongation. No yield point is observed in these determinations.

EXAMPLE 4

A. Polymer Preparation

A slurry of 19 g of activated alumina in 487 ml of cyclohexane is placed in a dry glass bottle under a nitrogen atmosphere. A solution of 4.8 mmol of tetraneophylzirconium in 24 ml of toluene is added with stirring. The bottle is sealed, and the catalyst slurry is stirred overnight using a magnetic stirrer.

A dry 5-gallon (19-liter) reactor is purged with propylene to remove nitrogen and then charged with 3300 g of propylene. After warming to 25° C., hydrogen is added to increase reactor pressure by 90 psi (6.3 kg/cm$^2$), and the catalyst slurry is injected by the method of Example 1 with stirring at 500 rpm. The reactor temperature increases to 35° C. on catalyst addition. Heat is applied to raise the reactor temperature to 40° C. The reactor temperature over the one-hour reaction period is 40°–64° C.; pressure 235–325 psi (16.4–22.7 kg/cm$^2$). During the course of the reaction, temperature is controlled within range by bleeding gas from the reactor, and additional hydrogen is injected to replace that lost by venting.

The polypropylene product is milled on a two-roll rubber mill at temperatures up to 120° C. to remove solvent. Stabilizers are also added at this time (0.2% of the condensation product of 3 moles of 3-methyl-6-tert-butyl phenol) with 1 mole of crotonaldehyde ("Topanol" CA) and 0.5% of dilauryl thiodipropionate ("Cyanox" LTDP). Stabilized polypropylene weighing 1948 g is obtained. The product is put on a two-roll rubber mill at 180° C. for 5 minutes to remove traces of solvent. Its inherent viscosity is 3.3, isotactic content is 36% and melting point is 146° C.

On extraction of a 200-g sample with boiling diethyl ether, the product is found to have an ether-soluble fraction that comprises 66% of the whole polymer and has an inherent viscosity of 1.9. The ratio of the inherent viscosity of the ether-soluble fraction to the inherent viscosity of the whole polymer is 0.58. Birefringence is clearly visible when a film formed from this fraction is stretched between crossed polarizing sheets at room temperature. An isotactic crystallinity of 3% is determined by $^{13}C$ nmr and a melting point of 57° C. and a $\Delta h_f$ of 1.6 cal/g obtained. No reduction in syndiotactic pentads is observed in the $^{13}C$ nmr. The dispersity is equal to 10.6. Birefringence is also clearly visible when a film made from the ether-soluble fraction is viewed under crossed Nicol prisms in a hot-stage polarizing microscope at about 25° C. When the temperature is raised at 10° C. per minute, the birefringence disappears at about 59° C.

A 31-mil (0.78-mm) film of the whole polymer shows an average tensile set of 85%. Its average tensile strength at break is 920 psi (65 kg/cm$^2$) at 725% elongation. No yield point is observed.

A 79-mil (2.0-mm) film of the same polymer is uniaxially stretched under ASTM conditions at 23° C. to 700% at 20 inches/min (51 cm/min) and allowed to relax at the same rate to no stress. The resulting sample is 330% of its original length, which indicates a draw ratio of 2.3. The drawn sample shows a tensile strength at break of 2206 psi (154 kg/cm$^2$) at 180% elongation at 20 inches/min (51 cm/min). It immediately recovers completely from this strain indicating very high elasticity. No yield point is observed.

B. Film Preparation and Testing

Films of various thicknesses are made from the product of part A by compression-molding at 225° C. followed by rapid quenching in water at 5°–10° C. Elastic behavior is measured by stretch-recovery tests, in which 2.2–4.2-mil (0.056–0.011-mm) films are elongated to 100%, 200%, and 300% of their original lengths, the stress removed and allowed to relax for one hour. The degree to which they recover is measured. The results are in the following table. Recovery, expressed in percent, is defined as $$100 \times \frac{\text{(length at maximum stretch} - \text{length of relaxation)}}{\text{(length at maximum stretch} - \text{original length)}}$$

| Elongation | Recovery |
|---|---|
| 100% | 92% |
| 200% | 91% |
| 300% | 88.5% |

A heat shrinkable film is prepared by biaxial orientation. A 30-mil (0.76-mm) film is heated at 125° C. for two minutes, stretched 4X simultaneously in perpendicular directions at 125° C. and a strain rate of 10,000%/min, allowed to anneal for five minutes at the 125° C. stretch temperature, cooled, and removed from the stretcher, whereupon it relaxes to (3.75X)$^2$. Film shrinkage is then measured at various temperatures, with the results shown in the following table:

| Shrinkage Temperature | Shrinkage | Shrinkage Tension* |
|---|---|---|
| 75° C. | 9% | 24 psi (1.7 kg/cm$^2$) |
| 100° C. | 26% | 35 psi (2.4 kg/cm$^2$) |
| 125° C. | 54% | 56 psi (3.9 kg/cm$^2$) |

*ASTM D-2838-69

EXAMPLE 5

A 0.00125 M solution of tetraneophylzirconium in cyclohexane is prepared. A suspension of an active supported catalyst comprising neophylzirconium aluminate on alumina is continuously prepared by feeding the 0.00125 M solution of tetraneophylzirconium at a rate of 294 cm$^3$/hr and a suspension of 0.0374 g alumina per ml mineral oil, at a rate of 1.4 g Al$_2$O$_3$/hr into a stainless-steel, stirred autoclave of 961 cm$^3$ capacity where it is diluted with 161 cm$^3$ of hexane maintained at 51° C. The alumina is prepared by drying in a stream of flowing N$_2$ at 1000° C. for six hours and partially rehydrating by contact with a 50% relative humidity atmosphere at 73° F. for 16 hours and then redrying by heating at 400° C. for 4 hours in a stream of flowing N$_2$. After a hold-up time of approximately 117 minutes, to allow for the reactions between tetraneophylzirconium and the activated alumina to produce neophylzirconium aluminate, the catalyst suspension is continuously fed to a 253 cm$^3$ stainless-steel autoclave, at the same rate, and there diluted with 158 cm$^3$/hr of cyclohexane. After a hold-up of 25 minutes in the autoclave the diluted catalyst suspension is continuously fed to a 253 cm$^3$ stainless-steel, agitated polymerization vessel maintained at 1850 psi (130 kg/cm$^2$) and 85° C. where it is contacted with propylene. The propylene is fed at the rate of 386 g/hr by introducing it into a stream of cyclohexane which is being fed at the rate of 592 cm$^3$/hr. An additional stream of 250 cm$^3$/hr of cyclohexane is fed as a flush for the agitator and the product stream is withdrawn at the same rate as the total feed so that the nominal residence time in the reactor is about 7.6 minutes. The product mixture passes to a chamber where the catalyst is deactivated by addition of a 0.00836 M solution of isopropanol in cyclohexane at the rate of 523 cm$^3$/hr.

The solution of polypropylene is continuously discharged through a controlled pressure-reducing valve into a product receiver maintained at 50° C. Polymer product is isolated by acetone treatment. The precipitated polymer is chopped in a Waring blender in the presence of acetone. The polymer crumbs are air dried in a hood, then dried in a warm mill. Twelve grams of product are produced per hour.

The product has an inherent viscosity of 3.0, an isotactic content of 44%, and a melting point of 150° C.

A 30-mil (0.76-mm) film of the whole polymer is prepared by hot-compression molding a sample of the product at 180° C. When samples of this film are extended at 20 inches (51 cm) per minute and immediately allowed to recover at the same rate to zero stress, they show an average tensile set of 89%. Another sample of this film in a stress-strain test to break shows a tensile strength at break of 1506 psi (106 kg/cm$^2$) at 780% elongation. No yield point is observed in these determinations.

The whole polymer is extracted with boiling diethyl ether, and the ether-insoluble fraction is then extracted with boiling hexane. The following data are collected:

| Fraction | % of Whole Polymer | $\eta_{inh}$ | % Isotactic | M.P. |
|---|---|---|---|---|
| Ether-soluble | 47 | 2.4 | 14 | 56° C. |
| Hexane-soluble | 23 | 3.8 | 47 | 111° C. |
| Hexane-insoluble | 30 | 3.3 | 65 | 155° C. |
| Whole Polymer | | 3.0 | 44 | 150° C. |

Bifringence is clearly visible when a film formed from the ether-soluble fraction is stretched between crossed polarizing sheets at room temperature. An isotactic crystallinity of 1% is determined by $^{13}C$ nmr and a $\Delta h_f$ of 2.7 cal/g observed. No reduction in syndiotactic pentads is observed in the $^{13}C$ nmr. The dispersity is equal to 7.6. Birefringence is also clearly visible when a film is viewed under crossed Nicol prisms in a hot-stage polarizing microscope at about 25° C. When the temperature is raised at 10° C. per minute, the birefringence disappears at about 60° C. The ratio of the inherent viscosity of the ether-soluble fraction to the inherent viscosity of the whole polymer is 0.80.

EXAMPLE 6

A. Polymer Preparation

A 1-gallon (3.8-liter) stainless-steel autoclave equipped with a stirrer is heated at 150° C. for two hours while being evacuated. The vacuum source is shut off, propylene charged to the autoclave to a pressure of 50 psi (3.5 kg/cm$^2$) and the system allowed to cool to room temperature.

A catalyst slurry is prepared by stirring 5.7 g of alumina and 188 ml of cyclohexane for 18 hours, adding a solution of 1.43 mmol of tetraneophylzirconium in 7.2 ml of toluene and stirring for 1.5 hours more.

The autoclave is vented to remove excess propylene evacuated at about 50 mm for one minute, and cooled below 0° C. Stirring at 500 rpm is started, and the autoclave is charged with 795 g of propylene. The system is warmed to 25° C. (pressure 130 psi; 9.1 kg/cm$^2$), and hydrogen admitted to the autoclave to a hydrogen partial pressure of 30 psi (2.1 kg/cm$^2$). The internal pressure continues rising to 185 psi (12.9 kg/cm$^2$). The catalyst slurry is injected as in Example 1. The system is heated to 35° C. over 14 minutes and then heated at 35°-51° C. for one hour at autogenous pressure (245-280 psi; 17.1-19.6 kg/cm$^2$), after which the autoclave is vented and cooled. The product is added to one liter of cyclohexane, and the mixture is allowed to stand overnight. Then one liter of acetone is added, the mixture is stirred in a blender, and the product is separated by filtration. This treatment with acetone is repeated. Finally the product is placed in a blender with one liter of fresh acetone containing 1.5 g of Irganox ® 1010 antioxidant. The mixture is allowed to stand overnight and stirred. The solid is separated by filtration, air-dried, and dried in a vacuum oven at 70°-80° C. for four hours, to give 247.3 g of solid polypropylene. The inherent viscosity of the product is 5.4, the isotactic content 36%, and the melting point 144° C.

On extraction with boiling diethyl ether the product is found to contain an ether-soluble fraction comprising 74.5% of the total polymer and having an inherent viscosity of 4.6. The part of the polymer that is insoluble in diethyl ether is extracted with boiling hexane, to give a hexane-soluble fraction constituting 11.4% of the total polymer and having an inherent viscosity of 4.6. The hexane-insoluble fraction constitutes 14.1% of the total polymer and has an inherent viscosity of 6.1.

When a film formed from the ether-soluble fraction is stretched between crossed polarizing sheets at room temperature, birefringence is clearly visible. An isotactic crystallinity of 1% is determined by $^{13}C$ nmr and a melting point of 60° C. and a $\Delta h_f$ of 1.5 cal/g observed. No reduction in syndiotactic pentads is observed in the $^{13}C$ nmr. The dispersity is equal to 6.2. The ratio of the inherent viscosity of the ether-soluble fraction to the inherent viscosity of the whole polymer is 0.85. Birefringence is also clearly visible when a film is viewed under crossed Nicol prisms in a hot-stage polarizing microscope at about 25° C. When the temperature is raised at 10° C. per minute, the birefringence disappears at about 88° C.

A 31-mil (0.78-mm) film of the whole polymer is prepared by hot-compression molding a sample of the product at 180° C. When samples of this film are extended at 20 inches (51 cm) per minute to 300% elongation and immediately allowed to recover at the same rate to zero stress, they show an average tensile set of 41%. Other samples of this film in stress-strain tests to break show an average tensile strength at break of 884 psi (62 kg/cm$^2$) at 725% elongation. No yield point is observed in these determinations.

B. Preparation and Properties of Blends

1. Ether-Soluble Fraction Plus Isotactic Polypropylene

Part of the ether-soluble fraction of Part A is stabilized by milling with 0.5% Cyanox ® LTDP thiodipropionate and 0.25% Topanol ® CA stabilizers. Samples of the stabilized ether-soluble polymer are blended with different amounts of isotactic polypropylene (Pro-fax ® 6523; 94% isotactic content; melting point 166° C.) on a rubber mill at 180° C. for 5 minutes. Films about 30 mils (0.76 mm) thick are compression-molded at 180° C., elongated 300%, and relaxed to determine tensile set as in Example 1, and then elongated to break at 20 inches/min (51 cm/min). The following data are obtained:

| % Pro-Fax ® 6523 | Tensile Set, % | Tensile Strength at Break psi (kg/cm$^2$) | % Elongation at Break | Yield Point |
|---|---|---|---|---|
| 0 | 26 | 568 (40) | >1000 | No |
| 5 | 26 | 370 (26) | 910 | No |
| 15 | 39 | 940 (66) | 980 | No |
| 25 | 68 | 1400 (98) | 860 | No |
| 33 | 110 | 1720 (121) | 730 | No |
| 40 | 128 | 1660 (117) | 540 | No |
| 50 | 207 | 1860 (131) | 640 | Yes (at 12% elong.) |

2. Whole Polymer Plus Isotactic Polypropylene

The whole polymer of part A, stabilized with 0.5% Cyanox ® LTDP and 0.25% Topanol ® CA as in Part B1, is mixed with Pro-Fax ® 6523 isotactic polypropylene on a mill at 180° C. to give a blend containing 20% of the Pro-Fax ®. Two samples of a 29-mil (0.74-mm) film that is compression-molded at 180° C. have an average tensile set of 68%; another sample has a stress-/strain tensile strength at break of 2000 psi (141 kg/cm$^2$)

at 780% elongation. Two samples of a film of a blend of the same polymers containing 33% of the Pro-Fax ® have an average tensile set of 128%. Two other samples have an average tensile strength at break of 2272 psi (160 kg/cm$^2$) at 680% elongation. No yield point is observed for either blend.

3. Ether-Soluble Fraction Plus Hexane-Insoluble Fraction

A blend of the ether-soluble fraction and the hexane-insoluble fraction of the whole polymer of part A containing 33% of the hexane-insoluble fraction is prepared by milling the polymers together at 150° C. by the methods of part B1 and B2, and a 31-mil (0.79-mm) film is compression-molded at 180° C. Two samples have an average tensile set of 52%, with no yield point. Two other samples have an average tensile strength at break of 1263 psi (89.1 kg/cm$^2$) at 760% elongation.

EXAMPLE 7

This example illustrates the lowering of the percent ether-soluble fraction and of the inherent viscosity of that fraction when an elastomeric polypropylene of the invention is milled.

A 1-liter stainless-steel autoclave equipped with a stirrer is heated at 150° C. with 500 ml of cyclohexane for 10 minutes, the cyclohexane removed at 90° C. under vacuum, and the autoclave purged with nitrogen at 150° C. for four hours. As the purge is continued, there is introduced a slurry of 1.0 g of alumina in 40 ml of cyclohexane. Hydrogen (8 ml at 500 psi; 350 kg/cm$^2$) is introduced, the autoclave cooled to 8° C., and 200 g of propylene added from a tared cylinder. The autoclave is warmed to 20° C., and a solution of 0.5 mmol of tetraneophylzirconium in 5 ml of toluene is introduced under nitrogen pressure as in Example 1 as the system is stirred at 500 rpm. The temperature rises to 24° C. immediately and to 28° C. in about 15 minutes, dropping to 23° C. at one hour, when the excess propylene is vented. The gel obtained is cut up into chunks and heated at 70° C. under vacuum to remove all volatiles. There is obtained 55.5 g of elastomeric polypropylene.

At this point the product has an inherent viscosity of 8.2, an isotactic content of 25%, and a melting point of 144° C. It contains 57% diethyl ether-soluble fraction, which has an inherent viscosity of 6.4, a dispersity of 13.9, a melting point of 51° C., and a $\Delta h_f$ of 1.6 cal/g. Birefringence is clearly visible when a film made from the ether-soluble fraction is viewed under crossed Nicol prisms in a hot-stage polarizing microscope at about 25° C. When the temperature is raised at 10° C. per minute, the birefringence disappears at about 85° C.

Fifty-three g of the product is then milled at 180° C. for 10 minutes with 0.265 g of Cyanox ® LTDP and 0.132 g of Topanol ® CA antioxidants. The milled product has an inherent viscosity of 7.5 and contains 22% ether-soluble fraction, which has an inherent viscosity of 1.5, a dispersity of 9.1, a melting point of 49° C., and $\Delta h_f$ of 1.7 cal/g. A sheet of the milled product 75-80 mils (0.19-0.20 cm) thick is compression-molded at 180° C. When samples of this sheet are extended at 20 inches (51 cm) per minute to 300% elongation and immediately allowed to recover at the same rate to zero stress they show an average tensile set of 39%. Other samples of this sheet in stress-strain tests to break show an average tensile strength at break of 1500 psi (105 kg/cm$^2$) at 910% elongation. No yield point is observed in these determinations.

EXAMPLE 8

Into the autoclave of Example 7, preconditioned as described therein, is introduced a slurry of 2 g of alumina in 80 ml of cyclohexane. The autoclave is closed and pressured with ethylene to 65 psi total pressure. The total pressure is then brought to 90 psi with hydrogen, the vessel is cooled, and 168 g of propylene is introduced. As the system is stirred at 500 rpm the temperature is raised to 50° C., and 4 ml of a solution of toluene containing 0.4 mmol of tetraneophylzirconium is pressured in with nitrogen. An immediate temperature surge to 95° C. occurs, and polymerization is permitted to proceed for one hour as the temperature gradually falls to 54° C. The excess propylene is vented at polymerization temperature and the product freed of volatiles by nitrogen purge and by evacuation at 70° C./0.2 mm. There is obtained 146 g of an elastomeric polypropylene/ethylene copolymer containing 6 mole % (4 weight %) of units derived from ethylene. Upon isolation it has inherent viscosity 5.9, ether solubility 64%, mp 142° C., and glass transition temperature ($T_g$) −21° C. The inherent viscosity of the ether-soluble fraction is 3.35. One hundred forth-three g of the product are milled at 150° C. for 10 minutes with 0.72 g Cyanox ® LTDP and 0.36 g of Topanol ® CA antioxidants. A sheet of the milled product 80 mils (0.20 cm) thick is compression-molded at 150° C. When samples of this sheet are extended at 20 inches (51 cm) per minute to 300% elongation and immediately allowed to recover at the same rate to zero stress, they show an average tensile set of 87%. Other samples of this sheet in stress-strain tests to break show an average tensile strength of 700 psi (49 kg/cm$^2$) at 900% elongation. No yield point is observed in these determinations.

The combined ethylene content was determined by $^{13}C$ nmr; see Tanaka and Hatada, J. Polym. Sci., Polym. Chem. Ed., 11 2057 (1973). $T_g$ was determined from the dsc curve; see Ke (above), p 350.

We claim:

1. As a new product, a fractionable elastic polymer consisting essentially of units derived from propylene which has an inherent viscosity of 1.5-9, a major melting point between about 135°-155° C., exhibits no yield point, has a tensile set not exceeding 150% and contains 10-80% by weight of a diethyl ether-soluble fraction which has an inherent viscosity exceeding 1.50, said diethyl ether-soluble fraction having an isotactic crystalline content of about 0.5% to about 5% by weight and exhibiting birefringence when a film formed from said fraction is viewed under crossed Nicol prisms in a polarizing microscope at about 25° C.

2. As a new product, a fractionable elastic polymer consisting essentially of units derived from propylene which has an inherent viscosity of 1.5-9, a major melting point between about 135°-155° C., exhibits no yield point, has a tensile set not exceeding 150% and contains from about 10-35% by weight of a fraction soluble in boiling hexane but insoluble in boiling diethyl ether, from about 10-55% of a fraction insoluble in boiling hexane and 40-75% by weight of a diethyl ether-soluble fraction which has an inherent viscosity exceeding 1.50, said diethyl ether-soluble fraction having an isotactic crystalline content of about 0.5% to about 5% by weight and exhibiting birefringence when a film formed from said fraction is viewed under crossed Nicol prisms in a polarizing microscope at about 25° C.

3. A polymer of claim 1 or claim 2 which has a tensile set not exceeding 100%.

4. A polymer of claim 1 or claim 2 which has an inherent viscosity of 2-8.

5. A polymer of claim 1 which contains about 40-75% by weight of said ether-soluble fraction.

6. A polypropylene of claim 1 which has an inherent viscosity of 3-8, a tensile set not exceeding 100% and contains about 40-75% by eight of a diethyl ether-soluble fraction having a inherent viscosity greater than 2.5.

7. A polymer consisting essentially of a blend of about 5-95 parts by weight of the polymer of claim 1 and about 95-5 parts by weight of highly isotactic polypropylene.

8. A polymer consisting essentially of a blend of about 60-95 parts by weight of the polymer of claim 1 and about 5-40 parts by weight of highly isotactic polypropylene.

9. A polymer of claim 1 in the form of a film.

10. A polymer film of claim 9 wherein the film is oriented.

11. A polymer of claim 8 in the form of a film.

12. A polymer film of claim 11 wherein the film is oriented.

13. A polymer of claim 1 in the form of an extruded tubing.

14. A polymer of claim 8 in the form of an extruded tubing.

15. A polymer of claim 1 which contains up to 10 mole % of polymerized α-monoolefin units other than propylene.

* * * * *

UNITED STATES PATENT OFFICE
CERTIFICATE OF CORRECTION

PATENT NO. : 4,335,225
DATED : June 15, 1982
INVENTOR(S) : John W. Collette and Charles W. Tullock It is certified that error appears in the above-identified patent and that said Letters Patent are hereby corrected as shown below:

Column 19, line 7 - delete "polypropylene" and insert

-- polymer --

Signed and Sealed this

Thirty-first Day of August 1982

[SEAL]

Attest:

Attesting Officer

GERALD J. MOSSINGHOFF

Commissioner of Patents and Trademarks